(12) United States Patent
McCully et al.

(10) Patent No.: US 9,348,942 B2
(45) Date of Patent: May 24, 2016

(54) PROMOTING PHILANTHROPY

(75) Inventors: George Elliott McCully, Dover, MA (US); Carl Mastandrea, Milton, MA (US)

(73) Assignee: Catalogue for Philanthropy, Watertown, MA (US)

( * ) Notice: Subject to any disclaimer, the term of this patent is extended or adjusted under 35 U.S.C. 154(b) by 258 days.

(21) Appl. No.: 13/352,873

(22) Filed: Jan. 18, 2012

(65) Prior Publication Data

US 2012/0185512 A1 Jul. 19, 2012

Related U.S. Application Data

(60) Provisional application No. 61/433,759, filed on Jan. 18, 2011.

(51) Int. Cl.
*G06F 17/30* (2006.01)
*G06Q 30/02* (2012.01)

(52) U.S. Cl.
CPC ...... *G06F 17/30964* (2013.01); *G06Q 30/0279* (2013.01)

(58) Field of Classification Search
CPC .......... G06F 17/30864; G06F 17/3064; G06F 17/30286; G06F 3/0482; G06F 3/04815; G06Q 10/10; G06Q 30/02; G06Q 30/0215; G06Q 30/0253; G06Q 30/0277; G06Q 20/08; G06Q 20/127; G06Q 30/00; G06Q 30/0279
USPC .......... 707/705, 708, 709, 710, 766, 767, 769, 707/770, 777, 779, 794, 797, 999.107, 805, 707/764; 705/1.1, 7.11, 7.34, 14.51, 14.73, 705/35, 39, 329; 715/200, 833, 700, 763, 715/768, 810, 825, 841, 843, 845, 851, 853, 715/854, 855, 864
See application file for complete search history.

(56) References Cited

U.S. PATENT DOCUMENTS

| | | | | |
|---|---|---|---|---|
| 8,055,548 | B2 * | 11/2011 | Staib et al. | 705/26.1 |
| 2001/0044758 | A1 * | 11/2001 | Talib | G06F 17/30622 705/26.1 |
| 2004/0267718 | A1 * | 12/2004 | Milligan et al. | 707/3 |
| 2006/0053104 | A1 * | 3/2006 | Ferrari | G06F 3/0482 |
| 2007/0021973 | A1 * | 1/2007 | Stremler | 705/1 |
| 2008/0010251 | A1 * | 1/2008 | Fontoura | G06F 17/30646 |
| 2009/0192873 | A1 * | 7/2009 | Marble | 705/10 |
| 2011/0264521 | A1 * | 10/2011 | Straka | 705/14.49 |

OTHER PUBLICATIONS

Taxonomy Tree Select, <https://drupal.org/project/taxonomy_tree_select>, posted by Danillionunes on Apr. 2, 2010, 2 pages.*
Charity Navigator, "Your Guide to Intelligent Giving", retrieved from the internet on Nov. 21, 2013, http://www.charitynavigator.org (2 pages).

(Continued)

*Primary Examiner* — Greta Robinson
(74) *Attorney, Agent, or Firm* — Fish & Richardson P.C.

(57) ABSTRACT

Among other things, a user can navigate a database of philanthropic charities systematically to select a set of charities of interest, by interactively specifying in any order a succession of one or more (e.g., up to five) different criteria to narrow the selection from more general to more specific. A result of applying each of the criteria is displayed in real time to the user.

19 Claims, 12 Drawing Sheets

(56) References Cited

OTHER PUBLICATIONS

Figure 1:
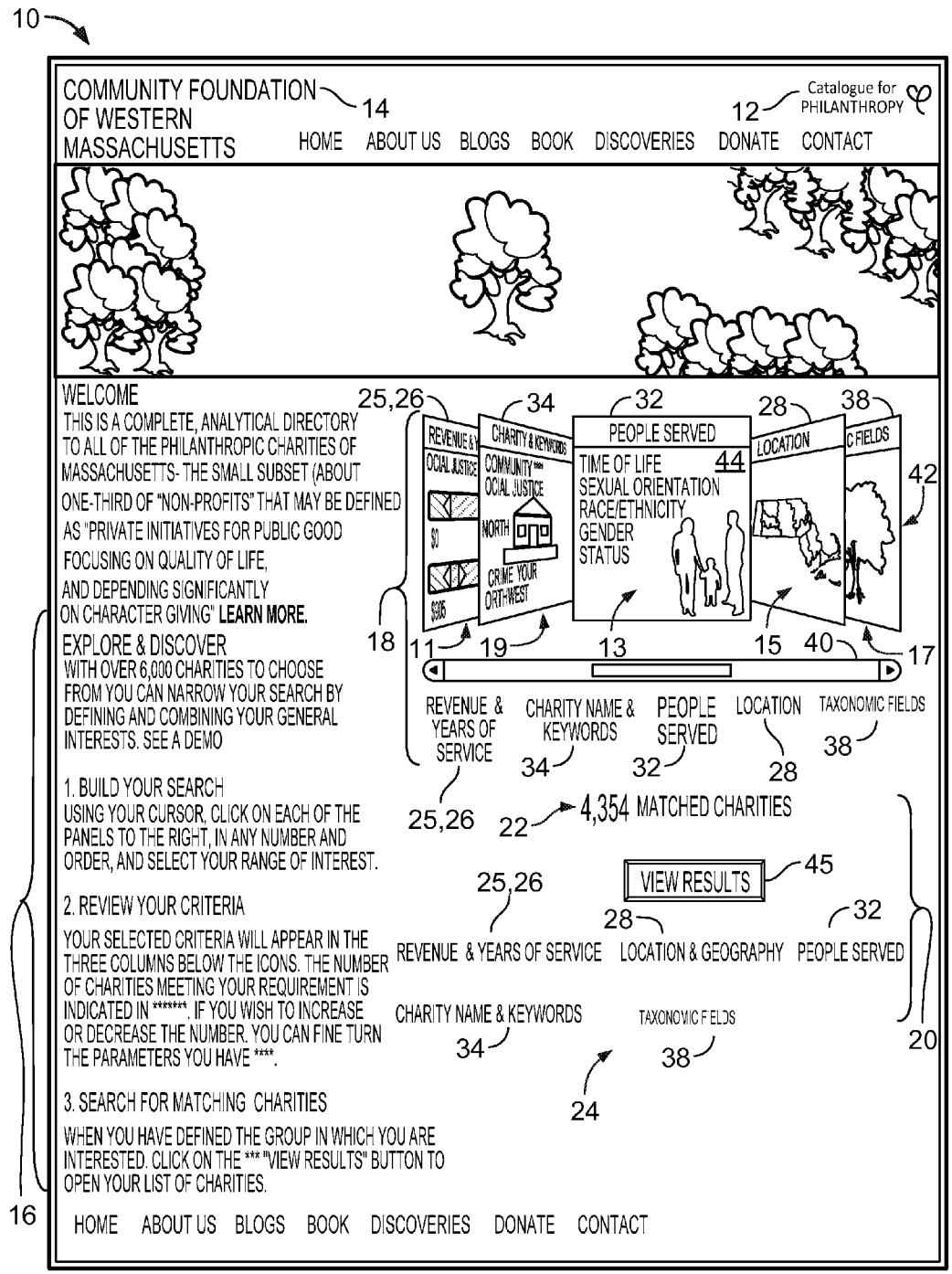

Charity Watch, "American Institute of Philanthropy", Helping Donors Make Informed Giving Decisions, retrieved from the Internet on Nov. 21, 2013, http://www.charitywatch.org (2 pages).

Great Nonprofits, "Read reviews of nonprofit organizations, NGOs and charities before you volunteer or donate", retrieved from the Internet on Nov. 21, 2013, http://greatnonprofits.org (3 pages).

Guidestart, "Nonprofit reports and Forms 990 for donors, grantmakers and business", retrieved from the Internet on Nov. 21, 2013, http://www.guidestar.org (1 page).

Network for Food, "The leading giving platform for powering your cause", retrieved from the Internet on Nov. 21, 2013, http://www1.networkforgood.org (1 page).

The Boston Foundation, "Don't just give. Solve.", retrieved from the Internet on Nov. 21, 2013, http://www.tbf.org/default.aspx (2 pages).

* cited by examiner

FIG. 14

PROMOTING PHILANTHROPY

This application relates to and claims the benefit of U.S. provisional patent application Ser. 61/433,759, filed Jan. 18, 2011, incorporated here by reference in its entirety.

BACKGROUND

This description relates to promoting philanthropy.

Philanthropy is an idea with a 2500-year history, and two cultures: one, which governed the long history, then was neglected and is now being revived, is humanistic; the other, which arose in the last century and is still dominant today, is social-scientific; it has tended to ignore the humanist tradition. Accordingly, philanthropy may be defined as "private initiatives, for public good . . . " (the social-science side), " . . . focusing on quality of life" (the humanistic side).

Over the course of the 20th century, large foundations have sought to professionalize philanthropy, to make it more sophisticated technically. By the end of the century professional staffs of foundations and charities were dominated by people trained in the social sciences. They tended to think in terms of group behavior and to focus on technical and procedural issues, using IRS and census data gathered by social scientists for governmental purposes. They saw society as composed of three sectors: government, business, and a third anomalous sector that is neither of those—it is tax-exempt, non-government, non-profit (meaning that it has no taxable profits). Their regulative ideal was not personal and educational or cultural, but institutional and societal: "civil society".

With the advent of the World Wide Web, online interactive sites are available that promote philanthropy and provide information about philanthropic charities.

SUMMARY

In general, in an aspect, a user can navigate a database of philanthropic charities systematically to select a set of charities of interest, by interactively specifying in any order a succession of one or more different criteria to narrow the selection from more general to more specific. A result of applying each of the criteria is displayed in real time to the user.

Implementations may include one or more of the following features. The database includes all charities of potential interest to the user. The set of charities selected by the user is a complete set of all charities that meet the criteria and are of potential interest to the user. The criteria include values or ranges of values of attributes of the charities maintained in the database. The criteria include fields and subfields in a systematic taxonomy of charities. The criteria include one or more of locale, revenue, age, people served, and field. The order of specifying the criteria can include repeating and retracing any of the criteria one or more times. The philanthropic charities exclude nonprofit organizations that are not engaging in private initiatives for public good that focus on quality of life and depend on charitable donations. The philanthropic charities include some but not all of the non-profit entities that are listed by the Internal Revenue Service as eligible for favorable tax treatment.

In general, in an aspect, a database of philanthropic charities is maintained in which each of the charities is represented by values for attributes. The attributes include fields and subfields in a systematic taxonomy for philanthropic charities, and other attributes. The database is exposed online to users to enable the users to select and alter the selection of sets of the charities of interest based on the attributes. The database includes all charities of potential interest to online users. The users select and alter the selection by specifying values or ranges of values of the attributes. The attributes include one or more of locale, revenue, age, people served, and field. The philanthropic charities exclude nonprofit organizations that are not engaging in private initiatives for public good that focus on quality of life and depend on charitable donations. The philanthropic charities include some but not all of the non-profit entities that are listed by the Internal Revenue Service as eligible for favorable tax treatment.

In general, in an aspect, a user can identify a set of philanthropic charities of interest, by navigating interactively through fields and subfields of a predefined, displayed taxonomy, each of the philanthropic charities being represented in a database by attributes that include the fields and subfields.

Implementations may include one or more of the following features. The user also can navigate interactively through at least one other attribute of the charities among the following set of attributes: revenue, population served, age, and locale. The fields of the taxonomy include missions of the philanthropic charities related respectively to nature, culture, and people. The user is enabled identify the subset of philanthropic charities by defining a search in the database using interactive controls on the displayed taxonomy. The interactive controls are based on open source code. The philanthropic charities that belong to the fields and subfields and that share a common geographic region include fewer than all of such philanthropic charities that are required to file form with the Internal Revenue Service. The locale includes a region of the United States that is larger than an individual municipality and smaller than the entire United States. The locale includes Massachusetts. The interactive online facility enables the user to navigate interactively through the fields and subfields is sponsored by an entity other than an entity that maintains the database. A sponsor of an interactive online facility that enables the user to navigate interactively through the fields and subfields is associated with a geographic region and shares use of the database with sponsors of other interactive online facilities that are associated with other geographic regions.

In general, in an aspect, a graphical device is displayed to a user of an online interactive facility that simultaneously represents fields and subfields of at least three different hierarchical levels of a systematic taxonomy of philanthropic charities. The user can navigate the taxonomy by invoking displayed controls on the graphical devices that represent the respective fields and subfields of the taxonomy. Information is displayed to the user about only the philanthropic charities represented by the displayed controls invoked by the user.

Implementations may include one or more of the following features. The graphical device includes an image of a natural tree and the fields and subfields of the taxonomy are represented by branches and leaves. Each of the displayed controls includes text that represents one of the fields or subfields. The fields include missions of the philanthropic charities related respectively to nature, culture, and people.

These and other aspects, features, advantages, and implementations, and combinations of them, can be expressed as methods, apparatus, systems, methods of doing business, program products, databases, means or steps for performing functions, and in other ways.

Other advantages and features become apparent from the following description and from the claims.

DESCRIPTION

Figure 12:
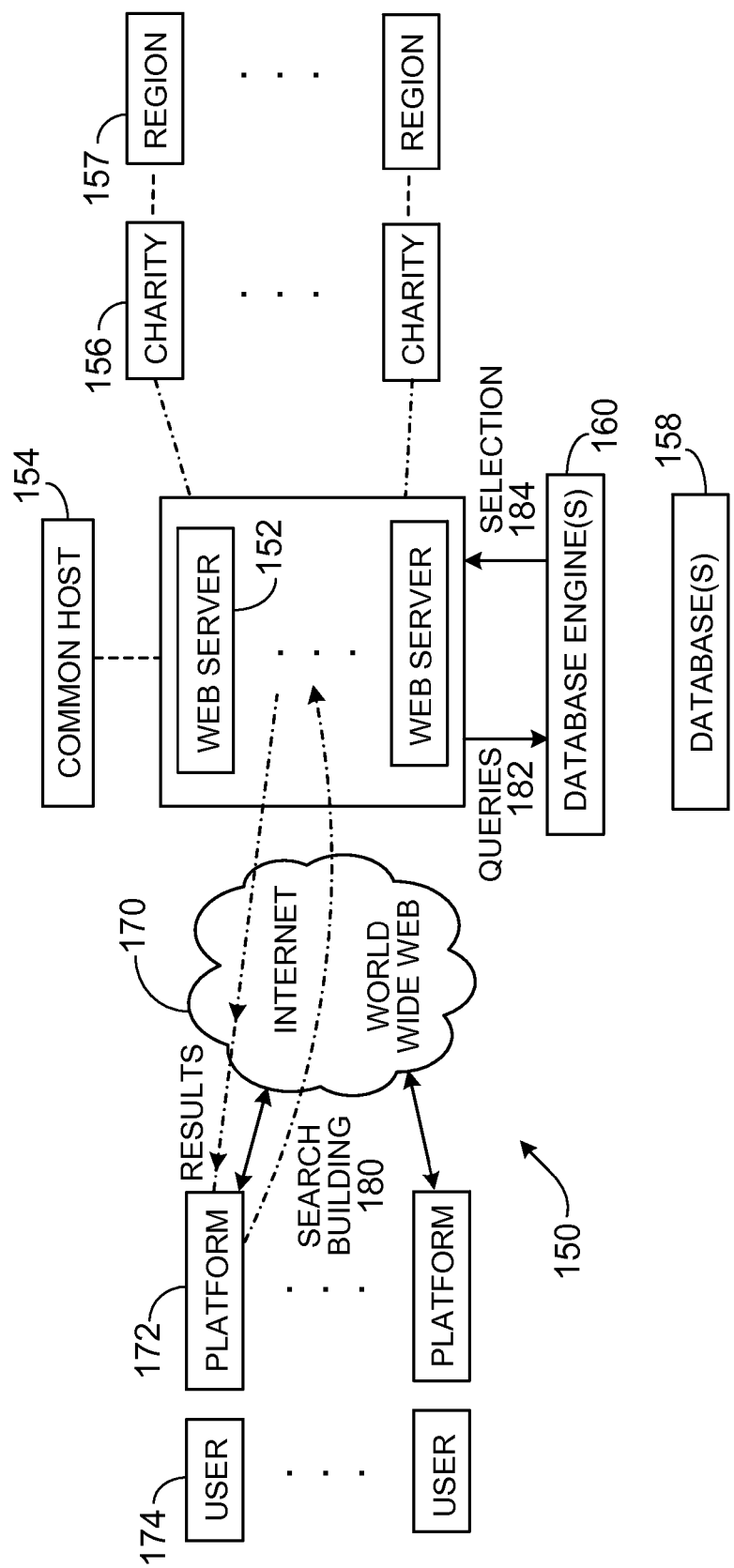
Figure 13:
Figure 15:
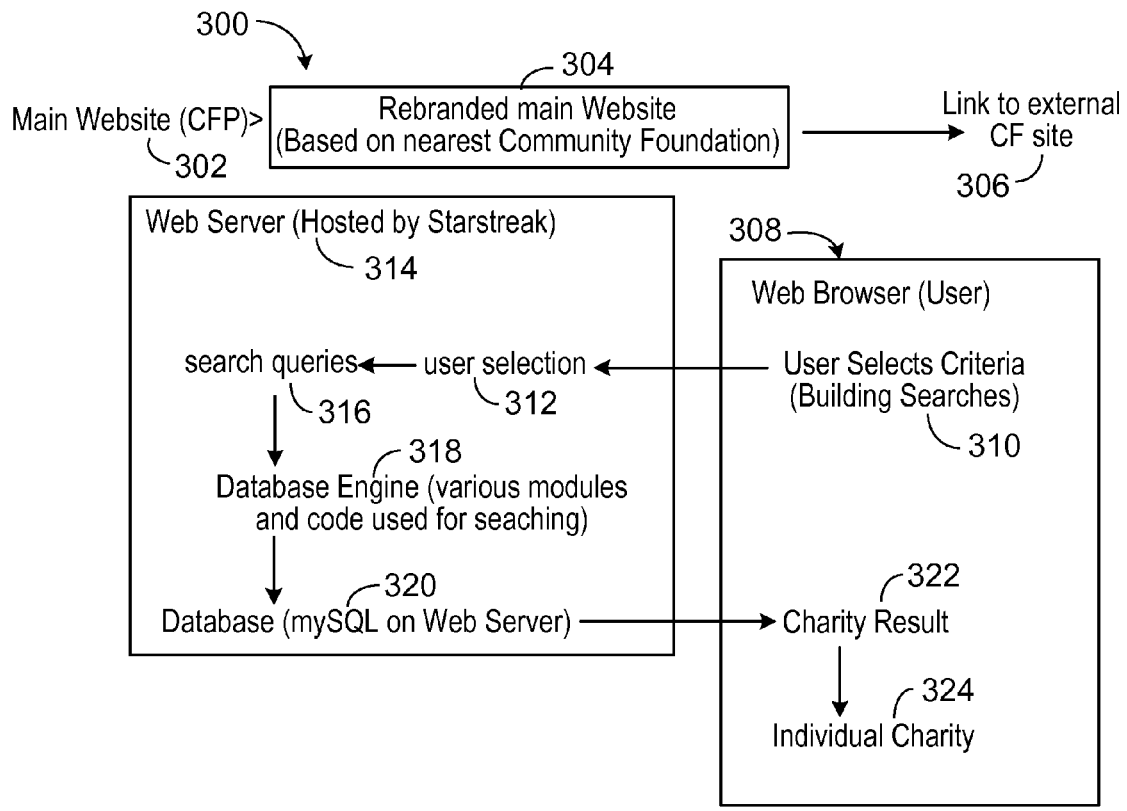

FIGS. 1 through 11 are screen shots.
FIG. 12 is a block diagram.
FIGS. 13 and 14 are screen shots.
FIG. 15 shows a site architecture.

Among the purposes of what we describe below are to educate users and encourage discussion about and study of philanthropy, provide a resource for comprehensive information about philanthropy, and promote philanthropy and charitable giving by:

1. Presenting philanthropy by itself, distinct and apart from the much larger, amorphous crowd of "nonprofit" institutions, which include many entities that are not philanthropic charities.
2. Presenting philanthropy completely—all philanthropic charities of broad interest to donors, so that everyone can know everything that's "out there", for greater control in philanthropic giving, investing, and volunteering, as well as in professional planning and management and in study and analysis.
3. Presenting philanthropy clearly and coherently—as an integrated whole of interdependent parts, systematically organized by fields, for more effective: (a) knowledge and teaching; (b) data recording, collection, and analyses; and (c) strategic development, by the profession and the public.
4. Focusing on distinct, actual, philanthropic markets—intense networks of people's interactions with charities, for example, as either donors of time or money, or recipients of services. The Commonwealth of Massachusetts as a whole is one such market, composed of many geographic region and parts—counties, municipalities, and community foundation service areas.
5. To illuminate and make accessible, as never before, the vast majority of charities that are relatively small and often overlooked by donors. Many of them represent the creative leading edge of philanthropy, responding to emerging needs and opportunities for public good.

An example discussed below, the Massachusetts Philanthropic Directory (the Directory), is being implemented with respect to philanthropy in Massachusetts. The Directory is only one example. The same principles can be applied in a very wide variety of ways to a wide variety of different groupings of philanthropic charities, including, for example, for other geographic areas.

When implemented and maintained carefully, the kind of website and underlying database described below, in the example of the Directory, becomes a permanent beneficial resource for philanthropy: the identification, charting and mapping—for donors, grant makers, scholars, and strategists—of the entire sector that is of general philanthropic interest. Donors in the covered geographic region (Massachusetts, in the example) and beyond will be able to visit, survey, explore, and discover for themselves the Massachusetts sector (in this example) as a whole—and where they would like to get more involved, to make a difference.

In this example, the Massachusetts sector will be for the first time fully visible, transparent, and accessible to the entire Massachusetts philanthropic community and the public broadly. It will place Massachusetts in the lead nationwide in making our philanthropic community fully accessible and understandable to everyone, as an organized system.

The example described here (and the broad principles that underlie the example) is the first of its kind: a complete, analytical, and collaborative, directory to all Massachusetts philanthropic institutions of possible interest to the general public—"private initiatives for public good, focusing on quality of life, and significantly dependent on charitable giving and volunteering."

The Directory is not a directory to "nonprofits". Philanthropies that raise funds from the general public are only about one-seventh of "non-profits", which include such institutions of no interest to donors as exclusive private clubs, condo associations, professional and trade associations, ordinary cemeteries, and retirement funds. To prove that the term "nonprofits" is a misnomer in reference to philanthropy, we direct users to the IRS Master File Data for Massachusetts nonprofits, so that everyone who uses the term can discover what it actually means. Therefore, when we use the term philanthropic charities, we do not include all non-profits, but rather only those non-profits that are of interest to the general public.

This is the first attempt to design, for best effects, a systematic, comprehensive interface between institutional philanthropy and the donating public. Previously there have been many accidental, fragmentary, and partial interfaces, which have not been optimally productive for philanthropy as a whole.

As a system, this is intended to be useful to everyone in and around philanthropy—donors, grantmakers, philanthropic advisors, strategic planners, journalists, scholars, students, and communities. The Directory is a prototype; we plan to extend this system nationwide over the next several years.

This is necessarily a collaborative venture; in promoting philanthropy we are all on the same team. Our mutual aim here is to establish by consensus, a complete list of philanthropic charities, organized by a common taxonomy of fields (we sometimes call these fields and subfields of a hierarchical taxonomy) and of demographics served, for donor education, data collection and analysis.

As illustrated in greater detail later, the Directory is accessible using an intuitive powerful unique easy-to-use interface. The user can build a search request to be used by the search engine to select, from a database of information about a large number of philanthropic charities (for example, all of them) in Massachusetts, those of interest to the user. The search request is based on choices specified by the user about a variety of attributes (criteria) of the charities. Information about the charities that meet the user's choices with respect to the criteria are displayed in a variety of easy to understand ways.

Because the Directory is intuitive, easy to use, and built on a carefully created taxonomy and a comprehensive database, it enables users to investigate, analyze, and develop, and test hypotheses more freely, quickly, accurately, and effectively than ever before possible. Among other things, donors can apply their philanthropic largess more intelligently and with greater satisfaction.

An important feature of the Directory is the taxonomy used to organize and categorize information with respect to the philanthropic charities covered by the database.

A taxonomy is a logical, systematic, ordering of a complex subject. The taxonomy that we describe here is a hierarchical list of fields and subfields in philanthropy that is systematic—its basic fields and subfields are logically related to one another, and taken together, they describe their subject completely, as a complex whole. Because such subjects are complex and even change over time, and knowledge increases, taxonomies are almost always collaborative works-in-progress.

We use the word systematic to refer, for example, to an approach to information that is thoroughly logical and logically coherent with respect to precisely defined and developed elements. For example, the IRS-generated and adapted National Taxonomy of Exempt Entities (NTEE) is not a systematic taxonomy because—its ten basic fields have no logical relation to each other, or in reference to the real world they purport to describe. To those are added, with no consistent logic or reference, lists of sub-fields (including unknown). Because the top ten fields are non-distinct and basically random, the whole structure is not coherent or rational.

Because of the size, complexity, and subtlety of philanthropy, making philanthropy readily accessible and attractive to the public as potential donors and volunteers, to journalists and scholars for analytical and educational purposes, and to professional philanthropists for sound strategizing, is not easy. Yet, given the significance of philanthropy to society, it is important to do. The system described here (using the Directory as an example, and its rich and effective interface) achieves this in a new and important way, in large part because it is built on a consensus taxonomic interface for these constituencies. The use of such a system, especially in a time of universal data explosion, will be immensely beneficial—for philanthropy, for everyone, and for our quality of life together.

The Catalogue for Philanthropy (http://www.cataloguefor-philanthropy.org/natl/) has been developing a systematic taxonomy of philanthropic fields for years. This work was driven partly by the need to present, in its annual publication, and in an organized way to help and encourage donors, a cumulatively-increasing number and variety of charities from all fields, all across Massachusetts. In working collaboratively with thousands of charities over the years, we found that they are all subsumable in three fundamental fields: Nature—our relations with the environment; Culture, our relations with what humans think, make, and do; and People, or our relations with each other. These fields are extremely stable over time (for data purposes)—they were classically proposed by Aristotle in his Physica, Meta-Physica, and Ethica. Together, they form a natural and comprehensive sequence, from the physical and material world, through humans' interactions with it, to human interactions with each other.

As implemented in the Directory, for example, the three basic fields branch out into a hierarchy of over 200 progressively narrower and more specific subfields at multiple levels of the hierarchy—more than any unaided human brain can know—which at each taxonomic level include everything subordinate to them. Defining each field is a dialogue between the facts—actual activities of actual charities—and requirements of logical organization. In using the interface, as users make a series of decisions about their interests, many charities are excluded and fewer are included at each step, as users guide themselves toward finding niches in philanthropy. To date, only a small percentage of the 4000+ charities in the online database being developed for the Directory have been assigned taxonomic fields and subfields.

A main source of information for inclusion in the database is the IRS Master Data File, which is based on Form 990s—the annual reports for federal tax purposes, which are by law public documents. To this we add information from the charities' websites, which are also public and entirely within their control. Furthermore, users are encouraged to contact charities directly. Our purpose is to use state-of-the-art technology to open all of philanthropy to the public, who provide 85% of all the private dollars.

The Directory as presented online through a web browser has a unique combination of features, some of which are individually unique. It focuses on philanthropy alone, apart from or as a selected subset of nonprofits, and on the subject of philanthropy it is meant to be complete, organized by the only systematic electronically accessible taxonomy of fields and subfields, and the only systematic demographics of people served (if that is a featured aspect of the charities' programs). The Directory presents philanthropy as intellectually attractive, interesting, and fun to explore.

The Directory can include, in addition to philanthropic charities, grant making institutions. There are over 4,000 private foundations in Massachusetts, and almost all of them make grants to more than one, and usually many, different philanthropic fields. Taxonomizing their interests consistently with the charities, for a statewide integrated system, will be challenging. Local charities may also be included although there is less need for it because donors in those localities are far more likely to know about them without a Directory, and because they are not of broader interest to the donating public.

Community foundation service areas, municipalities, and counties, are included as significant philanthropic markets. The purpose of community foundations is to enhance the quality of life in their communities, by promoting philanthropy—capacity-building for the charities, and increasing philanthropic engagement among donors, measured by increasing charitable giving and volunteering. Functionally then, they are poised at the center of their communities' philanthropy.

FIG. 1 shows an introductory webpage 10. This webpage, and other webpages associated with the site are served from a server (or set of servers) that is operated and maintained by a common sponsor identified 12 in the upper right corner of the page. In this case, the common sponsor is the Catalogue for Philanthropy and we refer to them as a common sponsor because they can sponsor the website on behalf of multiple organizations (for whom it is, as one might say, private labeled). From the point of view of a user, the site appears to be a site sponsored by, for example, a community foundation. Sometimes we refer to the organization for whom the site is private labeled as the sub-sponsor.

We use the word sponsor and sub-sponsor to refer to entities that are concerned with the content of the database and the user interface features. We distinguish these entities from the host or hosts of the physical webservers that serve the website on behalf of the sponsor and sub-sponsors.

A goal of the system described here is to establish a common understanding and a common taxonomy and vocabulary to be used universally for the purpose of categorizing philanthropic charities. The result will be less costly and more effective ways to store information about such charities and make the information available to users.

In some implementations, the websites of all of the sub-sponsors of private labeled versions have exactly the same user interface and pages, and are served using exactly the same universal database. The only difference among the private labeled sites is the identification of the specific sub-sponsor on the front page. When a user uses a web browser to find and open the universal site, the user's IP address is analyzed and its geographic location determined by publicly available associative geo-data. Each sub-sponsor is associated with a list of zip-codes that relate to its activities. Based on a matching of the IP address of the user with the zip-codes associated with the sub-sponsors, the server will cause the user's browser to display 14 the logo of the sub-sponsor that is the closest. The sub-sponsor's name as displayed on the page is then linked to the sub-sponsor's official webpage.

In some examples, it will be possible for the private labeled sites to be different in ways other than only the inclusion of the private labeled name 14. For example, although the schemas of the underlying databases may be similar, the portions of the data in the databases that are used for the respective privately labeled websites could be focused on the geographic regions associated with respective private label hosts.

The webpage 10 describes and makes accessible a key feature of the website. This feature is explained 16 as the ability to build and fine tune a search in an intuitive and interactive way using the navigation device 18. The part of the webpage in the lower right 20 displays top-level results 22 and reminds the user of the selections for the criteria 24 that led to the results. The summarized criteria listed in 20 also allow the user to remove items directly by invoking links displayed under each of the criteria without the need to open the pop-up windows referred to below.

In general, the user is provided with a variety of tools with which to indicate values or ranges of values (selections) for the different criteria, and in that way to specify the parameters of a search to be applied to the database by a database engine that is invoked by the server. As the user specifies and changes the various values or ranges of for each of the criteria, the results are automatically and immediately updated for viewing by the user. The user can make selections and change the selections for each of the criteria in a sequence of steps and can make selections and change the selections multiple times for each of the criteria. This allows the user to explore the database in complex and sophisticated (or simple and quick) ways to select a set of charities of interest, or otherwise study how the charities are arrayed with respect to any of the criteria or combinations of them. This allows investigation and study at a level and with a degree of sophistication and accuracy that has not been possible. In addition, the user can be confident that all of the charities that could possibly be of interest are included in the database and therefore the results of the navigation and selection made by the user are complete. When the user is specifying criteria and ranges of them, if no values or ranges are specified or selected for a criterion, the system assumes, as a default, that any value will meet that criterion. For example, if no budget size is specified, then any budget size satisfies that criterion.

There are five main attributes of charities that the user employs to build her search by specifying criteria for one or more of the attributes. We use the term attributes, for example, to refer to characteristics of charities. The attributes have values (for example, an attribute "annual revenue" could have the attribute $2,495,000 for a given charity). We use the term "criteria" to refer, for example, to selections by a user of values or ranges of values of interest with respect to respective attributes. For example, the user may be interested in charities that have an annual revenue of $2,500,000 (though such a selection is unlikely to yield any result), or in charities whose annual revenues are in the range of $2,000,000 to $3,000,000. In the examples discussed here, the five attributes have been carefully selected to permit the user to find public charities of interest to her, or to otherwise analyze and study public charities and groups of them with respect to one or more of the criteria. A wide variety of other attributes may also be useful.

In this example, the five attributes are: (1) revenue 25, (2) years of service 26; (3) locale 26; (4) the people it serves 32; and (5) fields and subfields 38 within the systematic taxonomy. The user can reach other layers (implemented in some examples as pop-up windows) on the homepage 10 that enable her to define ranges or values for each criterion using either of two navigational devices 40, 42. The device 40 is a slider. The device 42 is a set of panels 44 through which the user can flip by clicking on the panel displayed in the center of the device. A button 45 can be invoked to view the results by applying the criteria in a search to records of the database.

The left-most panel 11 enables the user to reach website pages (or pop-up windows) that permit selections for the first two criteria (revenue, years of service); the third panel 13 for people served, the fourth panel 15 for location, and the fifth panel 17 for taxonomy. The second panel 19 enables searching based on the charity's name and keywords, which are searching aids but not criteria in the sense that we intend here. The name and keywords are attributes found in the database, which makes the searching based on them possible.

The criteria used to build searches can be based on information provided by the charities, or developed by the sponsor or sub-sponsor of the database, or provided by a third party, or combinations of those. Of the five attributes of the example discussed here, location, revenue, and year of IRS authorization are derived from tax reports on form 990 as filed by the charities, taxonomy is developed by the Catalogue for Philanthropy, and people served are derived directly from websites of the charities.

Figure 2:
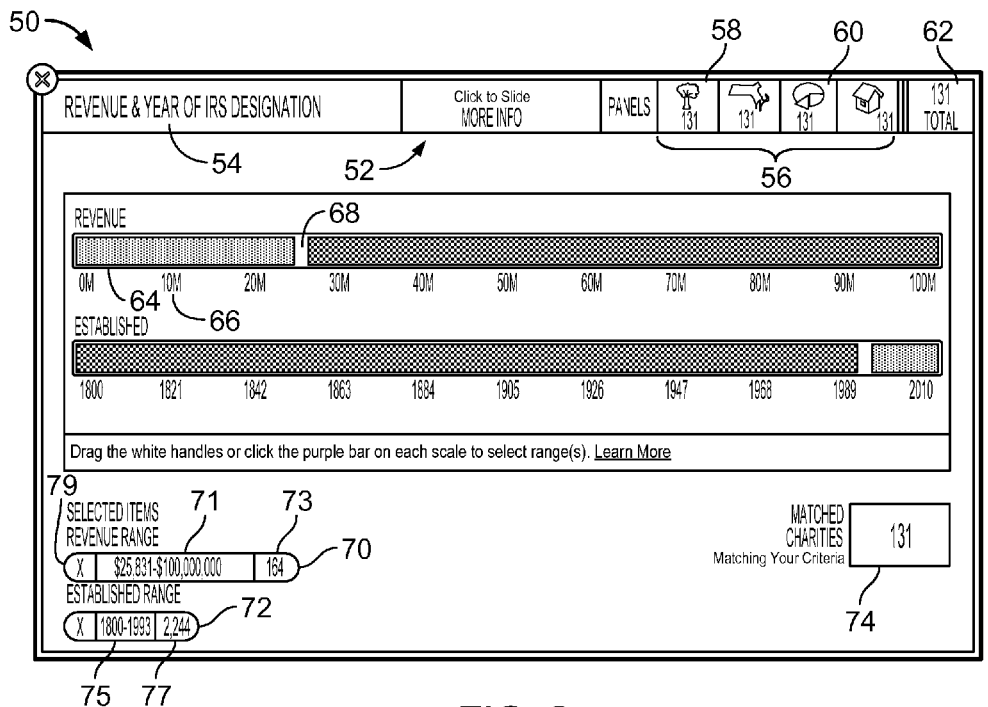

When the user invokes the revenue and years of service attributes (using one of the devices 40, 42), she is presented with a pop up window 50 shown in FIG. 2. We also sometimes refer to the pop-up window as a subpanel, and other similar pop-up windows or sub-panels for others of the five attributes, has a header bar 52 that includes the title 54 of the current attribute, and a set of four reporting panels 56 that represent the other four attributes not featured on the currently displayed pop-up window. Each of the panels includes an icon 58 that graphically represents one of the attributes.

A user only needs to make selections in one of the five panels, and within that panel, only needs to select one criterion. Even without doing so, clicking "View Results" without selecting any criteria will allow her to search through every charity in the database.

A displayed number 60 represents the number of philanthropic charities that both (a) fit the values or the range of values specified by the user for the attribute that is featured in the currently displayed pop-up window 54 and (b) also fit other values or ranges of values already supplied by the user for the criterion represented by that icon. For example, the number 131 in the left-hand panel indicates that, of the total number of charities represented in the database, 131 of them meet both the values or ranges set by the user in this pop-up window 54 and the values or ranges previously set by the user for the taxonomy attribute 58.

As shown in the window 50, there are two sliders 64 that include cursors 68 that the user can slide left and right to indicate values for revenue (in accordance with the scale 66 shown below the slider) and the established date of the charity (in accordance with the dates shown below that slider). By "established date" we mean the date when the IRS first authorized the charity to engage in fund-raising of grants and donations. By moving the sliders, the user sets ranges, the lower or upper values of which are at the far left (in the case of the revenue slide) or the far right (in the case of the established slider). The other value of each range is represented by the position of the slider. For example, the range represented by the position of slider 68 is from approximately $25 million to $100 million. As the user moves the slider left or right, a message (not shown in the figure) appears above the slider and indicates the current value associated with the slider. Numbers of charities that meet the criteria and other values that are computed by the engine based on the application of the search criteria to the database are continually updated and the updated values displayed in an all relevant places on the website.

At the lower left of the window 52, two reporting bars 70, 72 report the results of the user's actions in positioning the cursor. The range of values 71, 75 currently selected by the user are reported next to the number 73, 77 of charities that fit the range. For example, there are 164 charities that fit within the revenue range between about $25 million and about $100 million. When both of the criteria (revenue range and date of establishment range) are applied to the database there are 131 charities that fit the criteria. This number is reported in a box 74 at the right.

The total number 62 words in the upper right of the pop-up window report the total number of charities that meet all of the values and ranges of values for all criteria, in this criterion window and all other similar windows for the other criteria.

To summarize: The number of philanthropic charities that satisfy each of the slider criteria is shown in the lower left. The number that meets the combination of the criteria set on the sliders of this window is shown in the lower right. (in some examples, the user could be given the choice between applying the criteria in a logical AND combination—matching both—or a logical OR combination—matching either) The number of charities that meet both the criteria of this window and each of the other four criteria, taken individually, are reported in the panels in the upper right corner. And the number 62 of charities that meet all criteria set by the user is shown in the extreme upper right corner of the window. (The value 62 may be zero even when other pop-up window tabs (56) show more than zero matches. This would be the case when each criterion's matched charities (for example, number 60) share values between each of the other criterion individually, yet do not share values among all five attributes together).

Each of the icons 58 can be invoked to take the user to the corresponding pop-up window.

The arrangement of the sliders and the variety of reporting windows, their simplicity, and the intuitive quality of their operation and display provide an extremely easy-to-use tool for the user to explore the contents of the database with reference to criteria that are of interest to the user.

Figure 3:
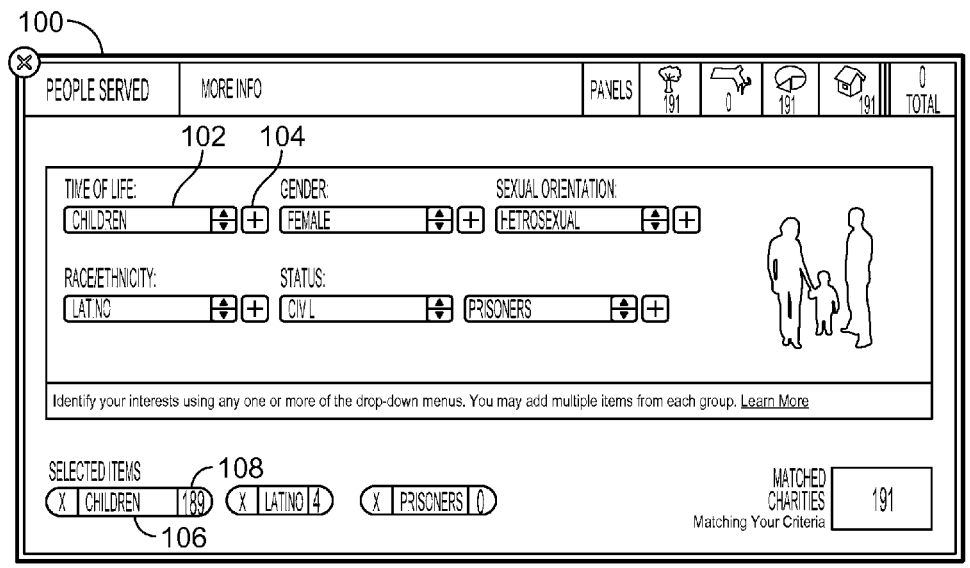

The interactive pop-up window 100 shown in FIG. 3 provides a similar opportunity for a user to select and indicate values or ranges of values for criteria associated with the top-level attribute: people served. In this case, rather than allowing the user to indicate ranges of numerical values, the user can select items that represent specific values of specific sub-attributes. This is done by drop-down boxes 102 and + buttons 104 used to confirm the user selection of values of attributes or sub-attributes. Criteria that have been specified by the user by invoking the + buttons are reported in reporting bars 106 at the lower left of the window. Each of the pop-up bars includes a number 108 representing the number of philanthropic charities that meet the criterion.

Figure 4:
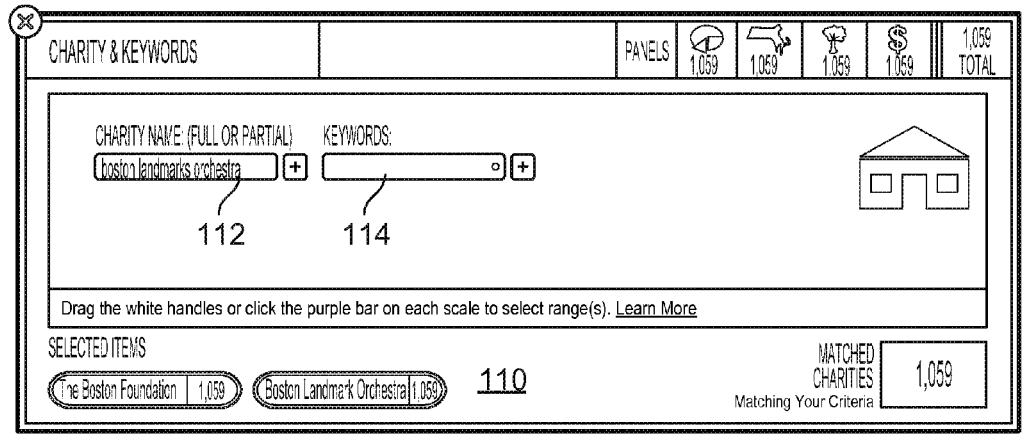

In the example shown in FIG. 4, a pop-up window 110, for the search items charity and keywords, provides free-entry text boxes 112, 114 in which the user can type words or phrases that represent a charity's name and keywords that may be used to identify and search for the charity. Each time the user invokes one of the + button, a search is done based on the entered text. If charities are found that meet the entered text, the number of hits is shown in the bars at the lower left.

The database can include keywords that have been specified by the sponsor with respect to each of the charities.

Figure 5:
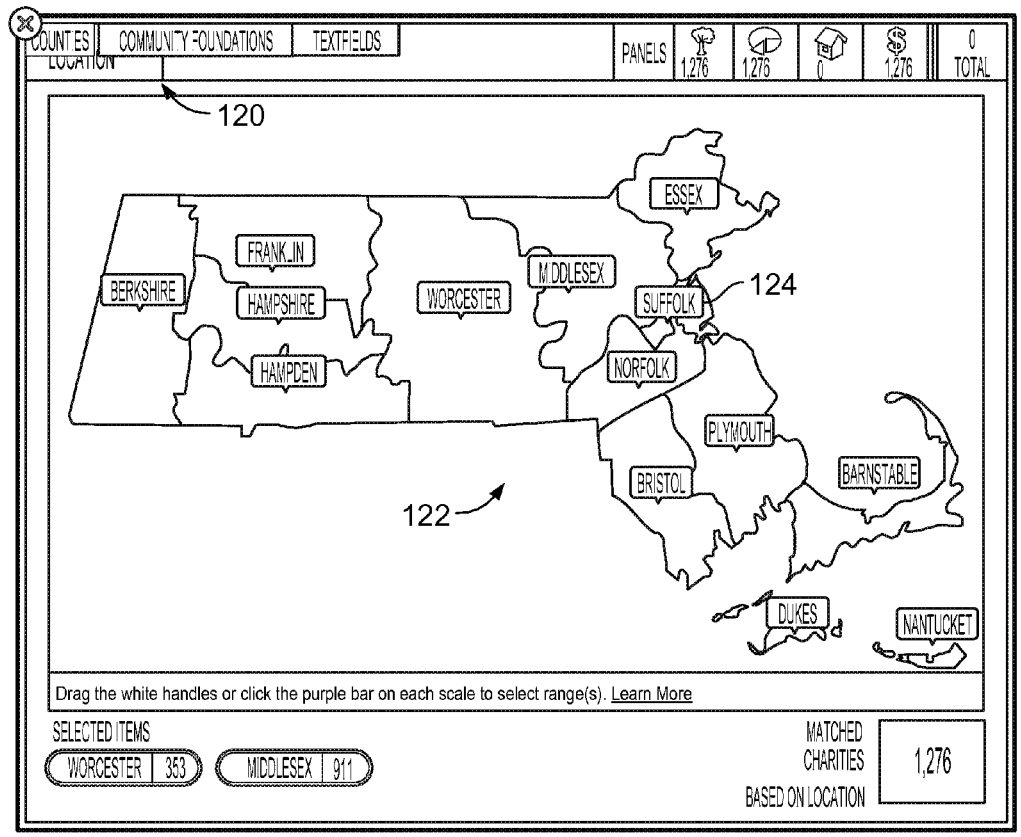
Figure 6:
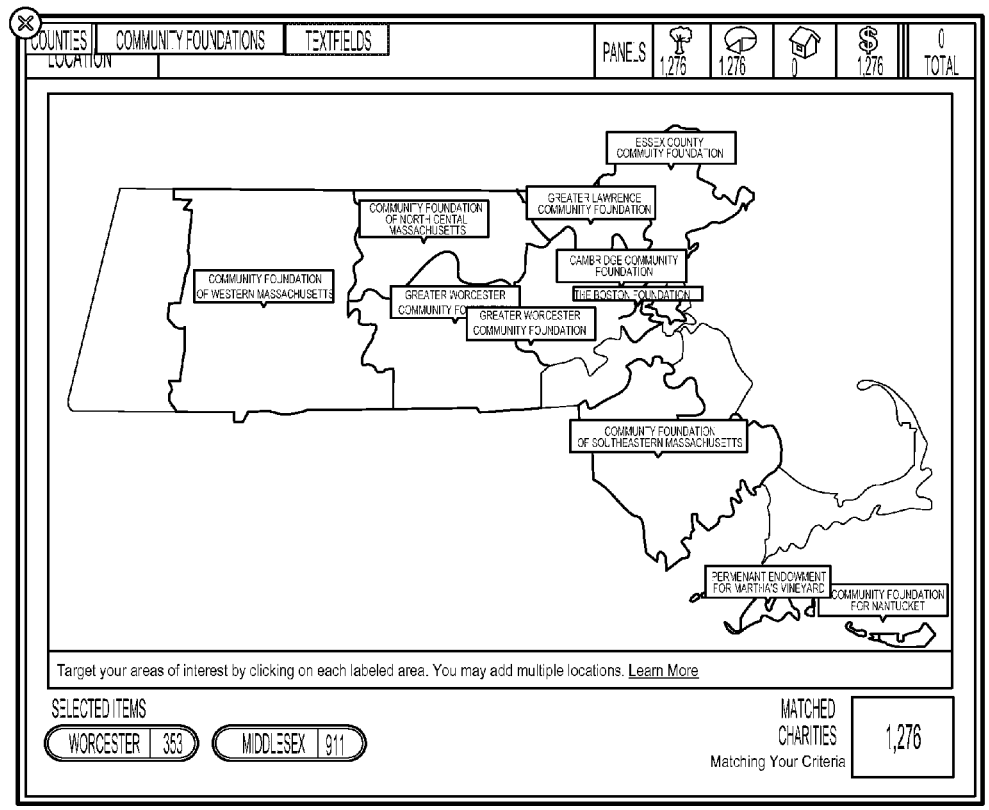
Figure 7:
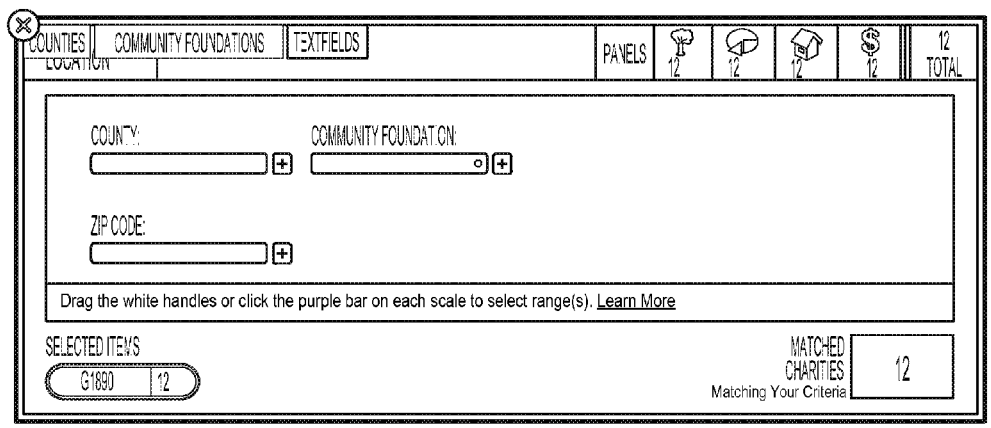

FIGS. 5, 6, and 7 represent three different versions of pop up windows for the location top-level attribute. The user can navigate from one to the other using the buttons 120 at the upper left. The three versions permit the user to specify values for three different sub-attributes related to location: Counties, Community Foundations, and Text Fields. In this example, the user would only use one of the three versions to specify a value for the location attribute. The user chooses which one to use and then makes selections.

As shown in FIG. 5, the county version displays a map 122 divided into counties 124 each of which is labeled. Each time the user invokes one of the county names, that county becomes part of the search range. Thus, the user can specify an interest in three or four or more different counties by invoking each of them.

The version of the pop-up window shown in FIG. 6 offers the map differently, in this case based on the areas associated with respective community foundations. The version shown in FIG. 7 allows the user to discretely select values for the sub-attributes by typing text.

Features of the user interface for selecting fields and sub-fields for the top-level attribute, taxonomic fields and sub-fields, are shown in FIGS. 8, 9, 10, and 11. When the taxonomic fields attribute is first invoked, the window of FIG. 8 years showing a natural tree with leaves, branches, and roots. Superimposed on the natural tree 130 is a hierarchical text tree (sometimes called a schematic) in which lines represent the relationship between sub-fields at one level and sub-fields or fields at another level. Small bars contain text identifying the values of a higher or the fields and subfields at the various levels of the hierarchy. Without the user taking any action, shortly after the loading process for this pop-up window of FIG. 8, the natural tree fades and the hierarchical tree diagram appears more prominently.

Figure 9:
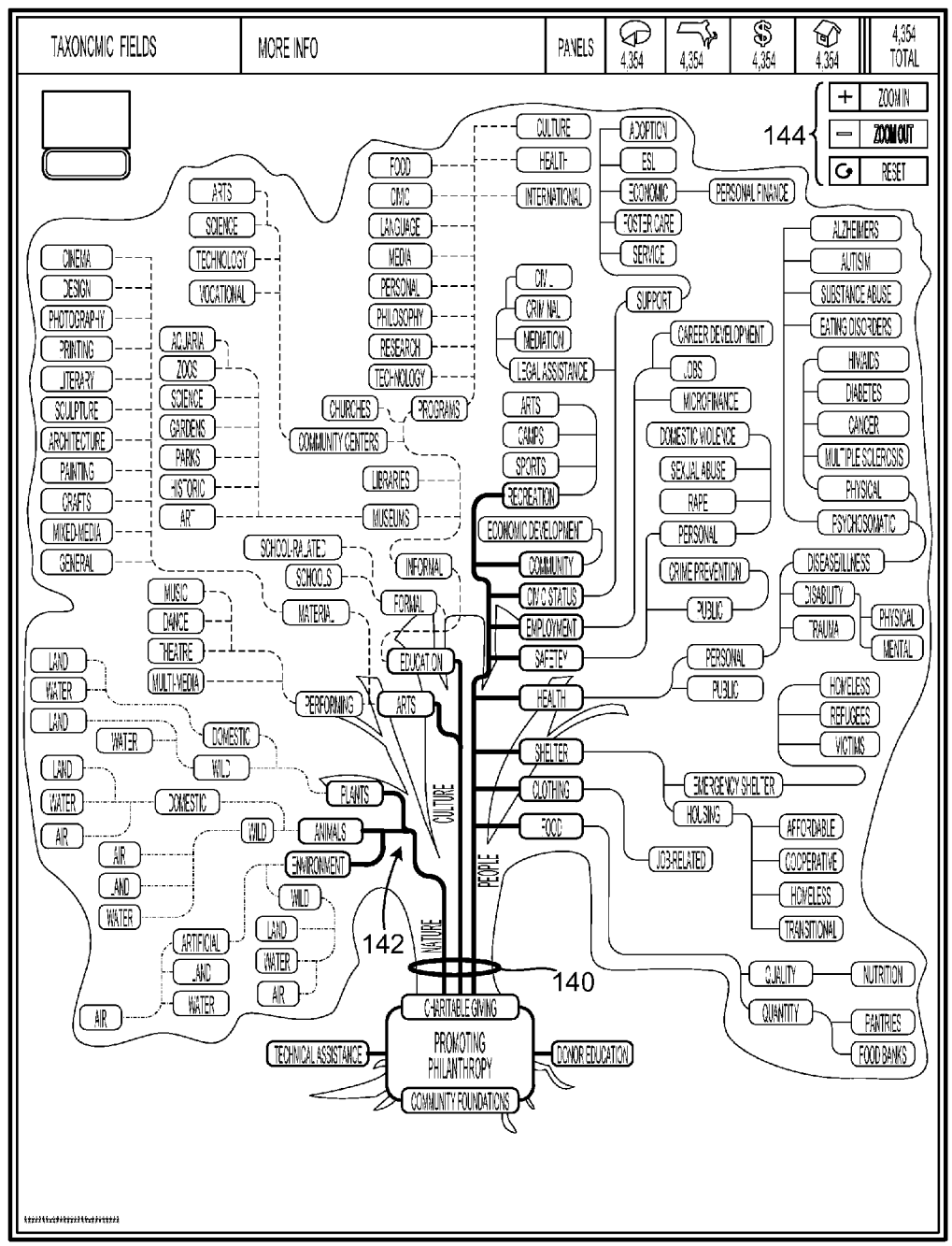

As shown in FIG. 9 and other figures, the fields and sub-fields of the hierarchy that are displayed to the user depend on the user's invocation of the various levels. In other words, the user navigates up the hierarchy and indicates selection of values for fields and subfields of the taxonomy by invoking portions of the schematic hierarchical tree that are superimposed on the natural tree. This provides for a very natural, intuitive, and easy-to-use interface.

Figure 10:
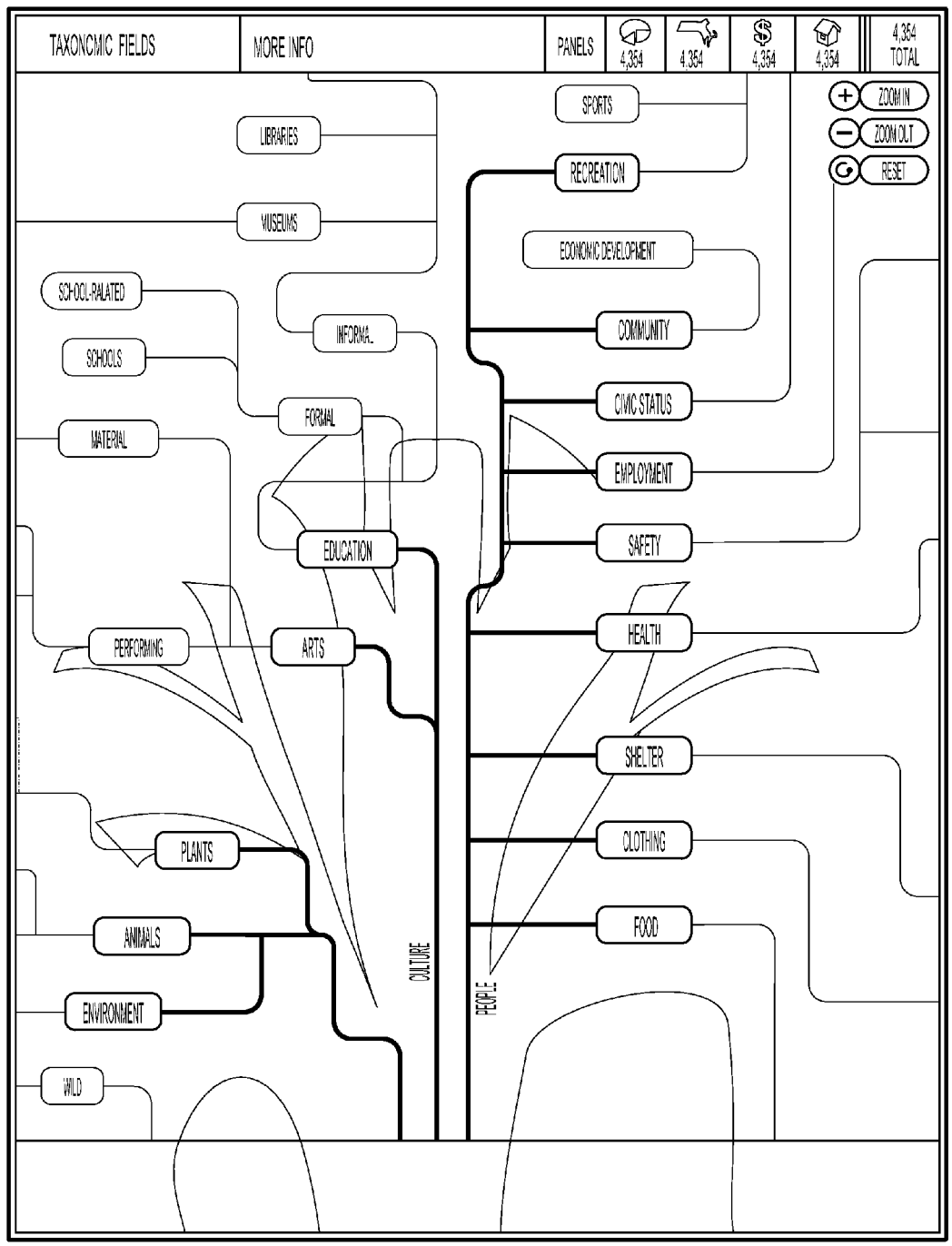

In FIG. 9, the three vertical lines rising from the box at the bottom 140 represent the three possible values of fields at the top of the taxonomic hierarchy: nature, culture, and people. Each of the three top-level fields branches 142 into a relatively small number of sub-fields at the next level up in the hierarchy. In the upper right of the window are three zooming buttons 144 which allow the user to zoom in and zoom out or reset the zoom level of the display of the natural tree and the hierarchical tree. FIG. 10 shows a zoomed-in version of FIG. 9.

Figure 8:
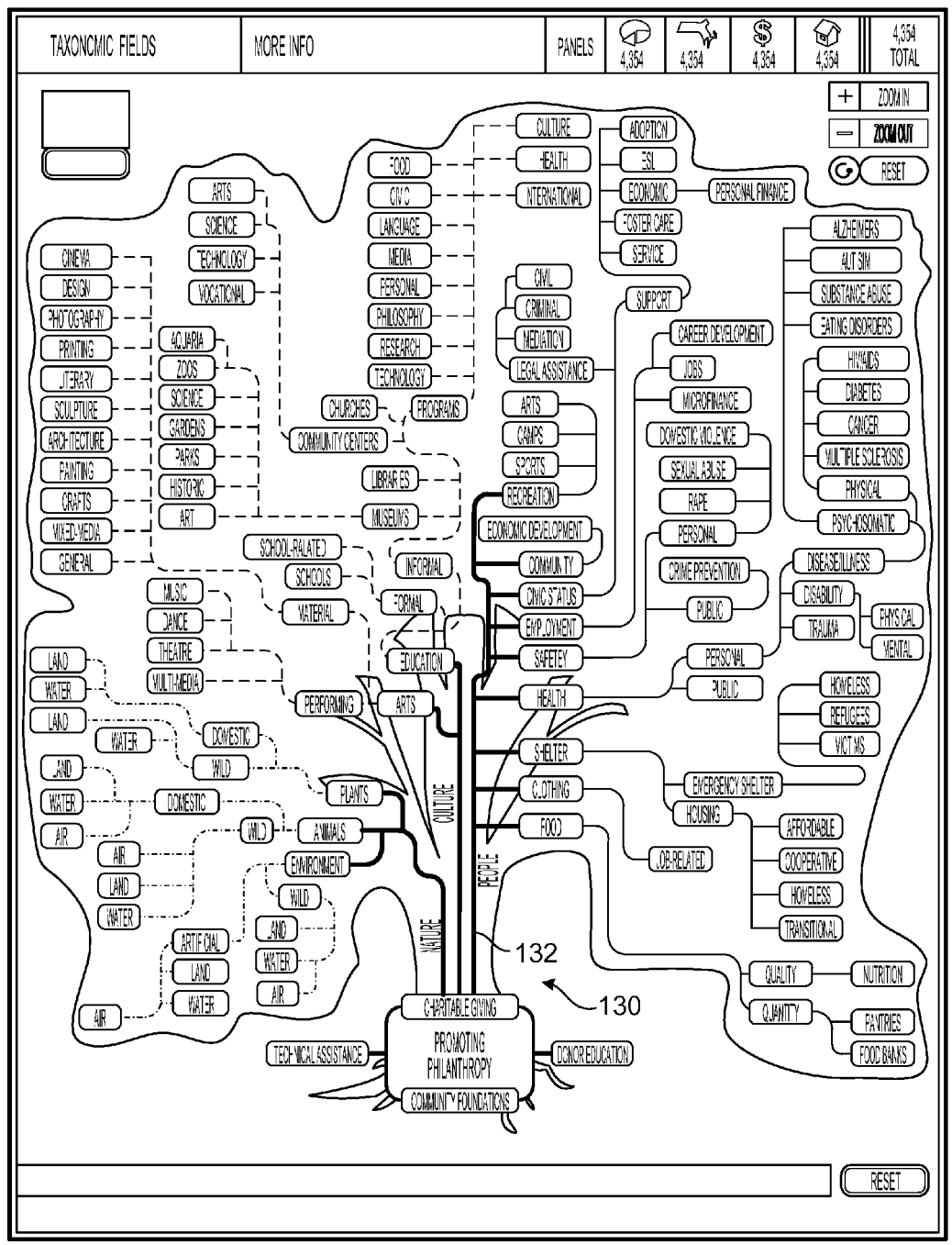

Note that in FIG. 10, as well as in FIGS. 8 and 9, levels of the taxonomic hierarchy that are above a first sub-level or which have not been explored/selected yet have been shown faded to indicate that they have not been invoked in any way by the user. The user indicates which values are of interest to her by clicking the displayed text bars within the diagram. Each time a text bar is selected or invoked, all of the values above that item in the next level of the hierarchy become visible and the user can invoke one or more of them. The user can also temporarily reveal all descendants of a term by hovering her cursor over a potential text bar; this causes all descendants of the hovered term to be faded in for previewing purposes only.

Figure 11:
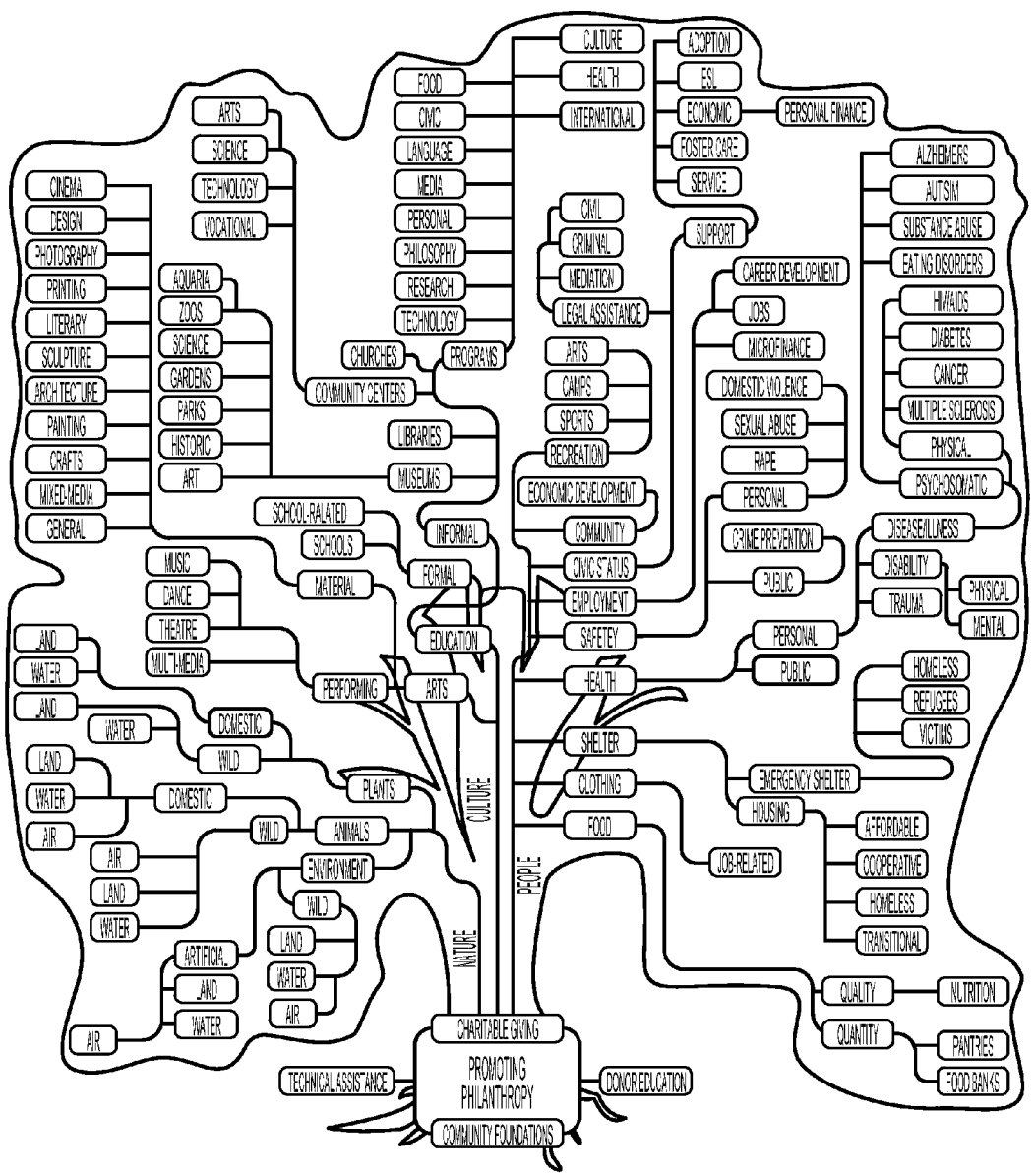

FIG. 11 shows an example of the entire taxonomic hierarchy, for reference. Decisions about the structure and content of the taxonomic hierarchy can be made by careful analysis of information about philanthropic charities and the factors that characterize them.

For easy reference, the entire hierarchy of this example is reproduced in text below:

In some implementations, the data that is maintained in the database for each of the philanthropic charities include the following (with explanation where the attribute description is not apparent from the title):

Title
Website (URL)
Full location (address)
    Address
    Phone
    Google maps link
Tax number (EIN)
Contact information
    Name
    Title
    Email
Established date (year of IRS designation)
Operating budget (revenue)
Charity logo (optional and moderated the sponsor)
Program information
Optional "executive summary"
People served (taxonomy of demographic information as tagged by the sponsor)
Philanthropic fields (both discretely and by lineage)
Keywords (tagged terms)

The taxonomy for the attribute, people served, is listed in the following table:

| TIME OF LIFE | Infants | | |
| | Children | | |
| | Adolescents | | |
| | Young Adults | | |
| | Adults | | |
| | Seniors | | |
| GENDER | All | | |
| | Male | | |
| | Female | | |
| | Trans- | | |
| SEXUAL ORIENTATION | Heterosexual | | |
| | Homosexual | | |
| | Bisexual | | |
| RACE/ ETHNICITY | Caucasian | Nationality | |
| | Latino | (Please fill in) | |
| | African | | |
| | Near/Middle Eastern | | |
| | Asian | | |
| | Pacific Islander | | |
| | Native Indigenous | | |
| STATUS: | Economic | Poor | |
| | | Lower Class | |
| | | Middle Class | |
| | | Wealthy | |
| | Medical | Healthy | |
| | | Disabled | |
| | | Diseased | |
| | Civil | Immigrants | |
| | | Military | Veterans |
| | | | Active |
| | | Prisoners | Current |
| | | | Former |
| | | Court-Involved | |
| | | Orphans | |

In one example, the taxonomy for the fields and subfields in which charities are categorized is as follows:

Nature
    Plants
        Wild
            Land
                advocacy
                animal welfare
                biodiversity
                climate change
                conservation
                education
                energy
                management
                oil spill
                pollution
                recreation
                recycling
                science
                toxics
                urban
            Water
                advocacy
                animal welfare
                biodiversity
                climate change
                conservation
                education
                energy
                management
                pollution
                recreation
                recycling
                science
                toxics
                urban
                oil spill
        Domestic
            Land
                advocacy
                animal welfare
                biodiversity
                climate change
                conservation
                education
                energy
                management
                oil spill
                pollution
                recreation
                recycling
                science
                toxics
                urban
            Water
                advocacy
                animal welfare
                biodiversity
                climate change
                conservation
                education
                energy
                management
                oil spill
                pollution
                recreation
                recycling
                science
                toxics
                urban
    Animals
        Wild
            Air
                advocacy
                animal welfare
                biodiversity
                climate change
                conservation
                education -continued

```
                    energy
                    management
                    oil spill
                    pollution
                    recreation
                    recycling
                    science
                    toxics
                    urban
            Land
                    advocacy
                    animal welfare
                    biodiversity
                    climate change
                    conservation
                    education
                    energy
                    management
                    oil spill
                    pollution
                    recreation
                    recycling
                    science
                    toxics
                    urban
            Water
                    advocacy
                    animal welfare
                    biodiversity
                    climate change
                    conservation
                    education
                    qenergy
                    management
                    oil spill
                    pollution
                    recreation
                    recycling
                    science
                    toxics
                    urban
Domestic
    Air
                    advocacy
                    animal welfare
                    biodiversity
                    climate change
                    conservation
                    education
                    energy
                    management
                    oil spill
                    pollution
                    recreation
                    recycling
                    science
                    toxics
                    urban
            Land
                    advocacy
                    animal welfare
                    biodiversity
                    climate change
                    conservation
                    education
                    energy
                    management
                    oil spill
                    pollution
                    recreation
                    recycling
                    science
                    toxics
                    urban
            Water
                    advocacy
                    animal welfare
                    biodiversity
                    climate change
```

-continued

```
                    conservation
                    education
                    energy
                    management
                    oil spill
                    pollution
                    recreation
                    recycling
                    science
                    toxics
                    urban
    Environment
        Wild
            Land
                    advocacy
                    animal welfare
                    biodiversity
                    climate change
                    conservation
                    education
                    energy
                    management
                    pollution
                    recreation
                    recycling
                    science
                    toxics
                    urban
                    oil spill
            Water
                    advocacy
                    animal welfare
                    biodiversity
                    climate change
                    conservation
                    education
                    energy
                    management
                    pollution
                    recreation
                    recycling
                    science
                    toxics
                    urban
                    oil spill
            Air
                    advocacy
                    animal welfare
                    biodiversity
                    climate change
                    conservation
                    education
                    energy
                    management
                    pollution
                    recreation
                    recycling
                    science
                    toxics
                    urban
                    oil spill
        Artificial
            Urban
                    advocacy
                    animal welfare
                    biodiversity
                    climate change
                    conservation
                    education
                    energy
                    management
                    pollution
                    recreation
                    recycling
                    science
                    toxics
                    urban
                    oil spill
```

- Suburban
    - advocacy
    - animal welfare
    - biodiversity
    - climate change
    - conservation
    - education
    - energy
    - management
    - pollution
    - recreation
    - recycling
    - science
    - toxics
    - urban
    - oil spill
- Rural
    - advocacy
    - animal welfare
    - biodiversity
    - climate change
    - conservation
    - education
    - energy
    - management
    - pollution
    - recreation
    - recycling
    - science
    - toxics
    - urban
    - oil spill Culture
- Arts
    - Material
        - General
            - community
            - creation
            - education
        - Cinema
            - community
            - creation
            - education
        - Photography
            - community
            - creation
            - education
        - Painting
            - community
            - creation
            - education
        - Printing
            - community
            - creation
            - education
        - Sculpture
            - community
            - creation
            - education
        - Crafts
            - community
            - creation
            - education
        - Design
            - community
            - creation
            - education
        - Literary
            - community
            - creation
            - education
        - Architecture
            - community
            - creation
            - education
        - Mixed Media
            - community
            - creation
            - education
    - Performing
        - Music
            - community
            - creation
            - education
        - Dance
            - community
            - creation
            - education
        - Theatre
            - community
            - creation
            - education
        - Multimedia
            - community
            - creation
            - education
- Education
    - Formal
        - School-related
            - academic education
            - support
            - vocational training
        - Schools
            - academic education
            - support
            - vocational training
    - Informal
        - Museums
            - Art
                - education
                - education
            - Zoos
                - education
            - Aquaria
                - education
            - Parks
                - education
            - Gardens
                - education
            - Historic
                - education
                - preservation
            - Science
                - education
            - Libraries
                - education
        - Community Centers
            - Arts
                - education
            - Science
                - education
            - Technology
                - education
            - Vocational
                - education
        - Churches
            - Programs
                - Civic
                    - education
                - Culture
                    - education
                - Food, Agriculture
                    - education
                - Health
                    - education
                - International
                    - education
                - Language
                    - education
                - Media
                    - education
            - Personal
                - Culture/Language
                    - education
                - Philosophy
                    - education
                    - ESL

```
                            Research
                                    education
                            Technology
                                    education
People
    Food
        Quantity
                Pantries
                        hunger
                Food Banks
                        hunger
        Quality
                Nutrition
    Clothing
        Job Related
    Shelter
        Housing
                Homeless
                Affordable
                Transitional
                Cooperative
        Emergency Shelter
                Victims
                Refugees
                Homeless
    Health
        Public
        Personal
                Disease/Illness
                        Physical
                                Cancer
                                        advocacy
                                        education
                                        prevention
                                        research
                                        support
                                        treatment
                                Diabetes
                                        advocacy
                                        education
                                        prevention
                                        research
                                        support
                                        treatment
                                Multiple Sclerosis
                                        advocacy
                                        education
                                        prevention
                                        research
                                        support
                                        treatment
                                HIV/AIDS
                                        advocacy
                                        education
                                        prevention
                                        research
                                        support
                                        treatment
                                Psychosomatic
                                Alzheimers
                                        advocacy
                                        education
                                        prevention
                                        research
                                        support
                                        treatment
                                Autism
                                        advocacy
                                        education
                                        prevention
                                        research
                                        support
                                        treatment
                                Substance Abuse
                                        advocacy
                                        education
                                        prevention
                                        research
                                        support
                                        treatment
                                Eating Disorders
                                        advocacy
                                        education
                                        prevention
                                        research
                                        support
                                        treatment
                        Disability
                            Mental
                                        advocacy
                                        education
                                        prevention
                                        research
                                        support
                                        treatment
                            Physical
                                        advocacy
                                        education
                                        prevention
                                        research
                                        support
                                        treatment
                            Trauma
    Safety
        Public
                Crime Prevention
        Personal
                Sexual Abuse
                Domestic Violence
                Rape
        Employment
                Career Development
        Jobs
        Microfinance
    Civil Status
        Legal Assistance
                Civil
                Criminal
                Mediation
        Support
                Adoption
                Foster Care
                Economic
                        Personal
                        Finance
                Service
                ESL
    Community
        Economic Development
    Recreation
        Sports
        Arts
        Camps
    Promoting Philanthropy
        Charitable Giving
        Community Foundations
        Donor Education
        Technical Assistance
```

As shown in FIG. 12, in some implementations, a system 150 for maintaining and using information about philanthropic charities includes one or more Web servers 152 that can be maintained by different hosts or by a common host 154. In some examples, a single web server is used and maintained on behalf of a common sponsor (such as the Catalogue for Philanthropy). (In some examples, each of the Web servers 152 can be associated with one or more philanthropic charities 156. In such examples, each of those philanthropic charities, or a host associated with it, can maintain one of the corresponding Web servers.)

In some examples, each of the Web servers represents an existing Web server associated with one or more of the philanthropic charities, and the system described here becomes an additional function to be provided by associated servers.

Conversely, the functions described here may all be served from one or a group of servers maintained by the common sponsor and private labeled for each of the respective philanthropic charities. In some examples, the format and user interfaces of the private labeled websites will be essentially identical (except for the private labeling) or at least substantially similar. An example of such a format and user interface has been illustrated and discussed earlier.

The various philanthropic charities 156 may differentiate themselves based on the geographic regions 157 that they serve, based on their fields of interest, or based on any of a wide variety of other differentiating factors.

Each of the Web servers or the group of them taken together (or subgroups of them) are supported by one or more databases 158 that are managed by one or more database engines 160. Information about philanthropic charities that are to be handled by a given Web server group of Web servers are stored in the corresponding databases and managed by the corresponding database engines.

Each database stores information about the corresponding philanthropic charities, including the taxonomic categorization and other kinds of information listed earlier.

In some examples, as discussed earlier, there is a single unified national or regional database that is used by multiple sponsors and their respective users. In such implementations, the common host 154 can maintain the single common database 158 that contains information about all of the philanthropic charities in all regions or fields and provides access to the common database for the one or more Web servers that use the information in order to serve its users. In some implementations, multiple databases can be maintained using identical or similar list of attributes for the respective groups of philanthropic charities needed for those databases.

Typically, the Web servers 152 operate through the Internet and World Wide Web 170 to serve information about the philanthropic charities through Web browsers operating on user platforms 172 based on interaction by users 174 through the Web browsers.

A wide variety of hardware and software platforms can be used ranging from desktop workstation to laptop computers, iPad, smart phones, and any other imaginable kind of fixed or portable device. The devices that serve as platforms may be publicly available kiosks or other similar devices.

In some implementations, the interaction between the user and the Web servers occurs by the user building searches 180, for example. The Web server translates the built searches into more formal database queries 182 and delivers them to the database engine 160. The database engine applies the search query to the database and returns a selection of philanthropic charities 184 to the Web server. The Web server translates the selection into features to be displayed to the user, forms corresponding provides webpages and serves them back through the user's Web browser. This process is conventional in Web serving technology as a basic request, search, and display protocol.

Referring again to FIG. 1, a summary of the built search and of the corresponding results is shown in the lower right panel 20. The number of matched charities 22, based on the criteria of the built search, is displayed above the view results button. Below the view results button, the five main search criteria are listed. Each time the user invokes one of the criteria and specifies ranges or values for the invoked criterion, those ranges or values are reported below the name of the criterion (not shown on FIG. 1), which gives the user a view of the underlying built search that resulted in the number of matched charities that are indicated.

After building a search and having the results returned, the user may click the view results button 45 to explore details about the philanthropic charities included in the results. When button 45 is clicked, the user is presented with the page shown in FIG. 13.

The number of charities that match the criteria of the built search is again reported in the upper left 190. The list of those charities is provided at the right 192. For each charity, certain key information is provided 194 and a button 196 can be invoked by the user to see additional information.

A map 208 on the left of the list of charities displays markers for the location of the charities that satisfied the built search. When the user invokes any one of the markers, additional information pops up (not shown) about the charity, including its address.

The page also contains a one-dimensional scatter plot 198 that illustrates data values or certain attributes of the charities. For example, the upper scatter plot, which relates to annual revenue, contains bars 200 arranged at locations that represent the respective annual revenues of the fixed charity. The range represented by the scatter plot is indicated below it with the lowest value above and the highest value below.

In the lower scatter plot, a bar 202 represents the year of the IRS approval of the charity.

Near the bottom of the page are displayed 204 certain criteria related to the charities and the values entered by the user as part of the built search. For example in this case, one of the criterion is taxonomic fields 206. Below that criterion is shown the user selected people and civil status values in two levels of the taxonomic hierarchy.

When the user invokes one of the buttons 196, she is taken to the page shown in FIG. 14. On this page, additional information about the charity is displayed including a generally associated (determined by the charity's philanthropic field) photograph 210, a map 212, a section 214 showing the location of the charity, the name, website, address, and employer identification number of the charity, and a range of additional information 216.

In the lower left, the scatter plots 218 are repeated, but the only bars that appear on the scatter plot are the ones that relate to this charity to show where it fits within the range of variables for the designated group.

An example of the site structure and flow is also shown in FIG. 15. As shown in the top line 300, the server serves a main common website 302. Based on the user's IP address and location information associated with the sub-sponsors, the main common site is converted to a rebranded website 304 for the closest matched one of the charities. A link 306 is also placed on the rebranded site which points to an external site of the sub-sponsor.

As shown in the bottom part of FIG. 15, during use of the rebranded site, a user working through a web browser 308 selects criteria for attributes of charities (and in that sense builds a search) 310. The user selections 312 represented by the built search are converted at the web server 314 into formal search queries (e.g., in SQL format) 316. A database engine 318 applies the SQL search to a database 320 to generate results in the form of numbers of charities and information about them. Those results 322 are provided at the web browser. The user can interact with the browser to fetch and view detailed information about an individual charity 324.

Other implementations are within the scope of the following claims.

The invention claimed is:

1. A machine-implemented method comprising:
 displaying to a user of an online interactive facility a
  graphical device that represents attributes of a systematic taxonomy of attributes of philanthropic charities for which records are stored in a database, the attributes comprising values, the values of at least one of the attributes being organized in a hierarchy, enabling a user to select charities of interest by invoking displayed controls on the graphical device that represent attributes of the taxonomy, the selection of the charities of interest including a selection based on the hierarchy of the values of the at least one attribute, the displayed controls comprising a set of displayed panels by which the user can navigate by invoking one of the panels or by operating an associated slider, and displaying to the user information about only the charities represented by the displayed controls invoked by the user.

2. The method of claim 1 in which the enabling of the user to select the charities of interest comprises enabling the user to interactively specify in any order a succession of one or more of the attributes including the at least one attribute for which the values are organized in a hierarchy and to specify one or more values of each of the attributes to filter the selection of charities from more general to more specific, a result of each of the interactive specifications being displayed to the user.

3. The method of claim 2 in which the succession of the attributes can include repeating and retracing any of the attributes one or more times.

4. The method of claim 2 in which the philanthropic charities exclude nonprofit organizations that are not engaging in private initiatives for public good that focus on quality of life and solicit and receive charitable donations.

5. The method of claim 2 in which the philanthropic charities comprise some but not all of the non-profit entities that are listed by the Internal Revenue Service as eligible for favorable tax treatment.

6. The method of claim 1 in which the database includes all charities of potential interest to the user.

7. The method of claim 1 in which the set of charities selected by the user is a complete set of all charities that meet the specified values and are of potential interest to the user.

8. The method of claim 1 in which the attributes include one or more of locale, revenue, age, people served, and field.

9. The method of claim 8 in which the locale comprises a region of the United States that is at least as large as an individual municipality or an individual zipcode and smaller than the entire United States.

10. The method of claim 8 in which the locale comprises an individual state or commonwealth.

11. The method of claim 1 in which the attributes comprise missions of the philanthropic charities related respectively to nature, culture, and people.

12. The method of claim 1 in which the charities that share a common geographic region comprise fewer than all of such philanthropic charities that are required to file form 990 with the Internal Revenue Service.

13. The method of claim 1 in which an interactive online facility that enables the user to select charities of interest may be sponsored by an entity other than an entity that maintains the database.

14. The method of claim 1 in which a sponsor of an interactive online facility that enables the user to select the charities of interest is associated with a geographic region and shares use of the database with sponsors of other interactive online facilities that are associated with other geographic regions.

15. The method of claim 1 in which at least one of the displayed controls comprises text that represents one of fields or subfields of the records of the database.

16. The method of claim 1 in which the records comprise fields that comprise missions of the philanthropic charities related respectively to nature, culture, and people.

17. A machine-based implementation method comprising displaying to a user of an online interactive facility, a graphical device that represents an attribute of a systematic taxonomy of attributes of philanthropic charities for which records are stored in a database, the attributes comprising values, the values of the attribute being organized in a hierarchy, and representing the hierarchy by a symbolic graphical element that portrays a tree, enabling a user to navigate the systematic ordering of the charities, and displaying to the user a portion of the values of the attribute, the portion being superimposed on the symbolic graphical element.

18. The method of claim 17 in which the graphical device comprises an image of a natural tree and the values of the attributes that are organized in a hierarchy are represented by roots, trunk, branches and leaves.

19. The method of claim 18 in which the natural tree is faded and a schematic tree is displayed.

* * * * *